United States Patent [19]

Nakamichi

[11] 3,882,542

[45] May 6, 1975

[54] CASSETTE TYPE TAPE RECORDER USING PLANETARY GEARING

[75] Inventor: Niro Nakamichi, Tokyo, Japan

[73] Assignee: Nakamichi Research, Inc., Tokyo, Japan

[22] Filed: Oct. 23, 1973

[21] Appl. No.: 408,852

[30] Foreign Application Priority Data

Oct. 23, 1972 Japan .............................. 47-10592

[52] U.S. Cl. .................. 360/96; 242/181; 242/198

[51] Int. Cl. ...................... G11b 15/00; G11b 23/08

[58] Field of Search ............ 360/92, 93, 94, 95, 96; 242/181, 198; 214/8.5 A

[56] References Cited

UNITED STATES PATENTS

| | | | |
|---|---|---|---|
| 3,542,370 | 11/1970 | Laa | 360/93 |
| 3,589,733 | 6/1971 | Piotrowski | 242/181 |
| 3,682,483 | 8/1972 | White | 360/92 |
| 3,708,176 | 1/1973 | Haake | 360/92 |
| 3,752,483 | 8/1973 | Olliges | 360/92 |
| 3,800,319 | 3/1974 | Fujimoto | 360/92 |

*Primary Examiner*—Bernard Konick
*Assistant Examiner*—Jay P. Lucas
*Attorney, Agent, or Firm*—Woodling, Krost, Granger & Rust

[57] ABSTRACT

A cassette type tape recorder comprising a cassette and a cassette container to receive said cassette therein and remove said cassette therefrom, said cassette container arranged so that it moves between a first position in which said cassette is positioned for playing the tape recorder and a second position in which said cassette is positioned for removal from said cassette container. An assembly, which includes magnetic head means and pinch roller means, has a first position in which said assembly is positioned for playing the tape recorder and a second position in which said assembly is retracted relative to said cassette. Operating means is movable to move said cassette container and said assembly to said first and second positions in response to movement and its direction of said operating means. When an operator fully inserts said cassette into said cassette container, a switching means is energized to drive said operating means through a driving system so that said cassette container and said assembly are moved to said first position, respectively. When the tape is decelerated or stops or when the ejection of said cassette is intended, another switching means remaining closed permits said operating means to continue to be moved in reverse direction so that said assembly is retracted and also said cassette container is moved to said second position.

10 Claims, 5 Drawing Figures

CASSETTE TYPE TAPE RECORDER USING PLANETARY GEARING

FIELD OF THE INVENTION

This invention pertains to a cassette type tape recorder and more particularly to a cassette type tape recorder wherein a cassette is slidden into the tape recorder for its operation and ejected therefrom at end of the operation.

BACKGROUND OF THE INVENTION

Of late, in various fields a cassette type tape recorder is required in which a cassette is automatically brought to the playing condition in response to insertion of the cassette into the tape recorder and the cassette is automatically ejected from the tape recorder simultaneously with the playing off condition of the latter in response to the tape reaching its end or the ejection intended. This is required particularly for a stereo tape recorder for a car or for a tape recorder of type adapted to sequentially serve a plurality of cassettes.

In the prior art, complicated mechanisms are incorporated into the tape recorder to meet such requirements, resulting in that assembly of the tape recorder is extremely troublesome and not suitable for mass production so that the tape recorder is highly expensive.

OBJECTS OF THE INVENTION

Accordingly, it is a principal object of the present invention to provide a cassette type tape recorder with simple mechanisms adapted to be brought to the playing condition in response to insertion of a cassette into the tape recorder and to be brought to the playing off condition simultaneously with that the cassette is ejected from the tape recorder in response to the tape reaching its end or to the ejection intended to be effected.

It is further object of the present invention to provide a cassette type tape recorder of the aforementioned type wherein the operation of the components from the insertion of the cassette to the playing condition is sequentially effected and wherein the reverse operation of the components is similarly effected.

BRIEF DESCRIPTION OF THE DRAWINGS

The above and other objects and features of the present invention will be apparent from reading of the description of the preferred embodiments taken with reference to the accompanying drawings.

DETAILED DESCRIPTION OF THE PREFERRED EMBODIMENT

Figure 1:
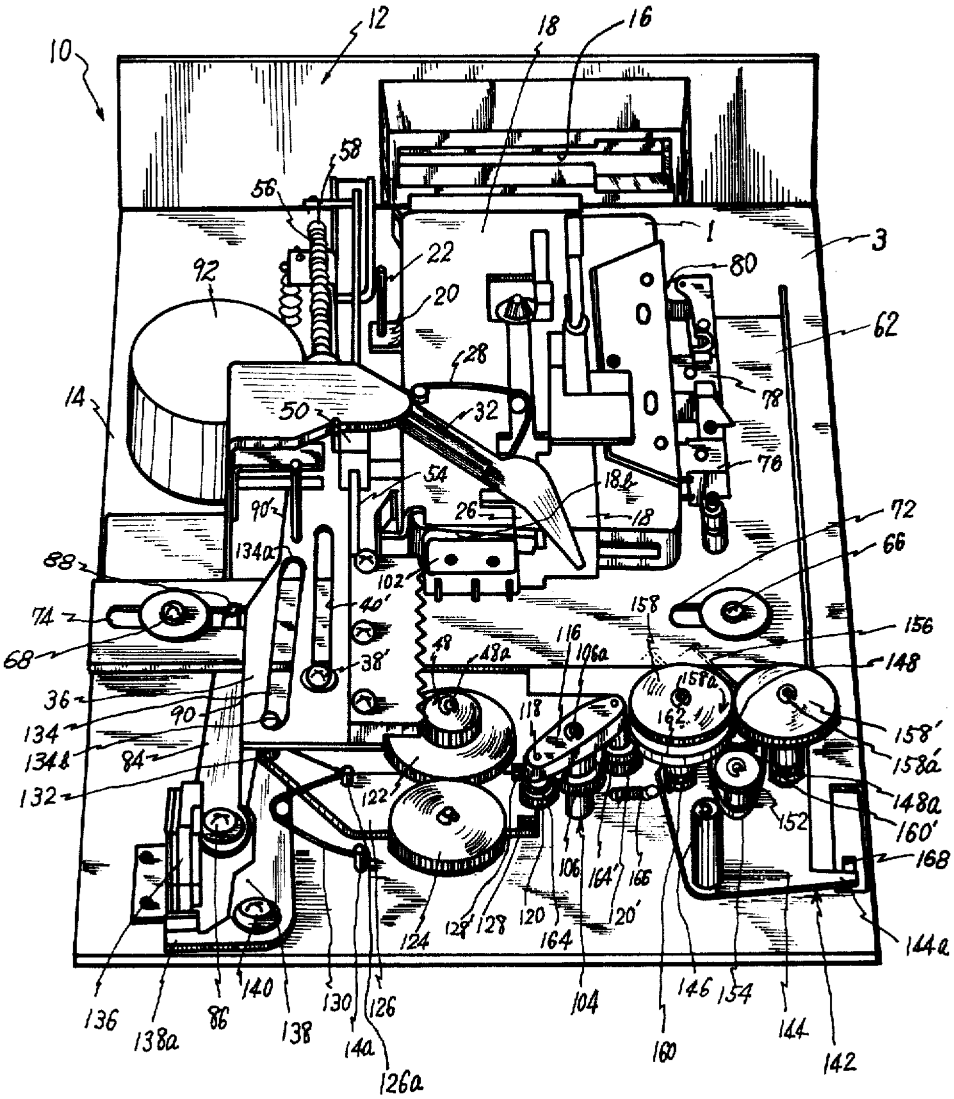
FIG. 1 is a perspective view of an embodiment of a cassette type tape recorder in accordance with the present invention with a cabinet broken away for illustration.
Figure 3:
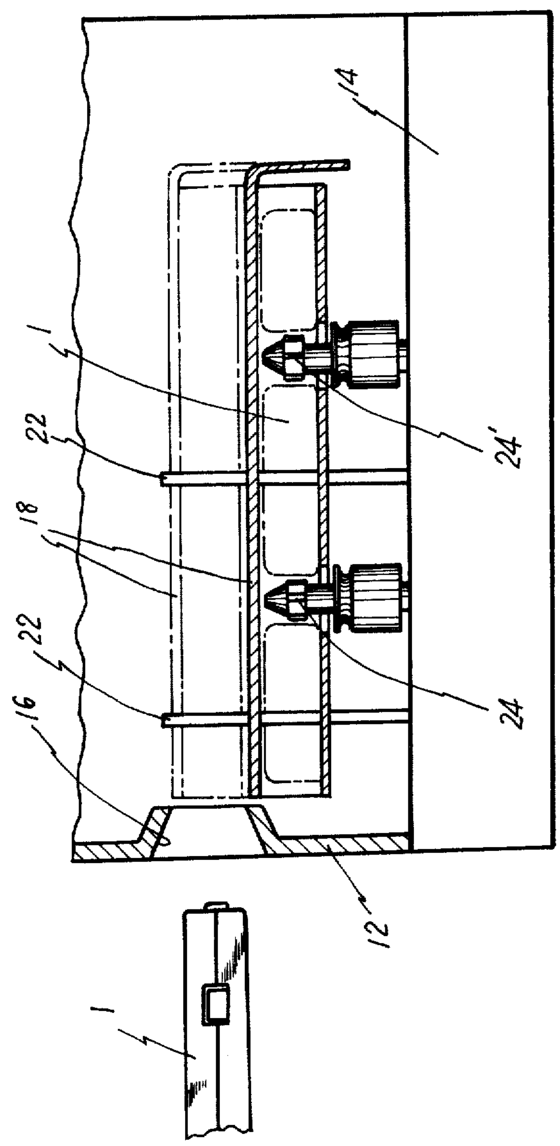
FIG. 3 is an enlarged and vertically sectional view of the cassette container in the cabinet shown in FIG. 2.

Referring now to FIG. 1 of the accompanying drawings, a cassette type tape recorder is indicated generally at numeral 10 and comprises a cabinet 12 including a chassis 14 mounted thereon. The cabinet 12 is provided with an opening 16 extending through one of the side walls of the cabinet, through which a cassette 1 is inserted into and removed from the cabinet 12 as shown in FIG. 3.

Figure 2:
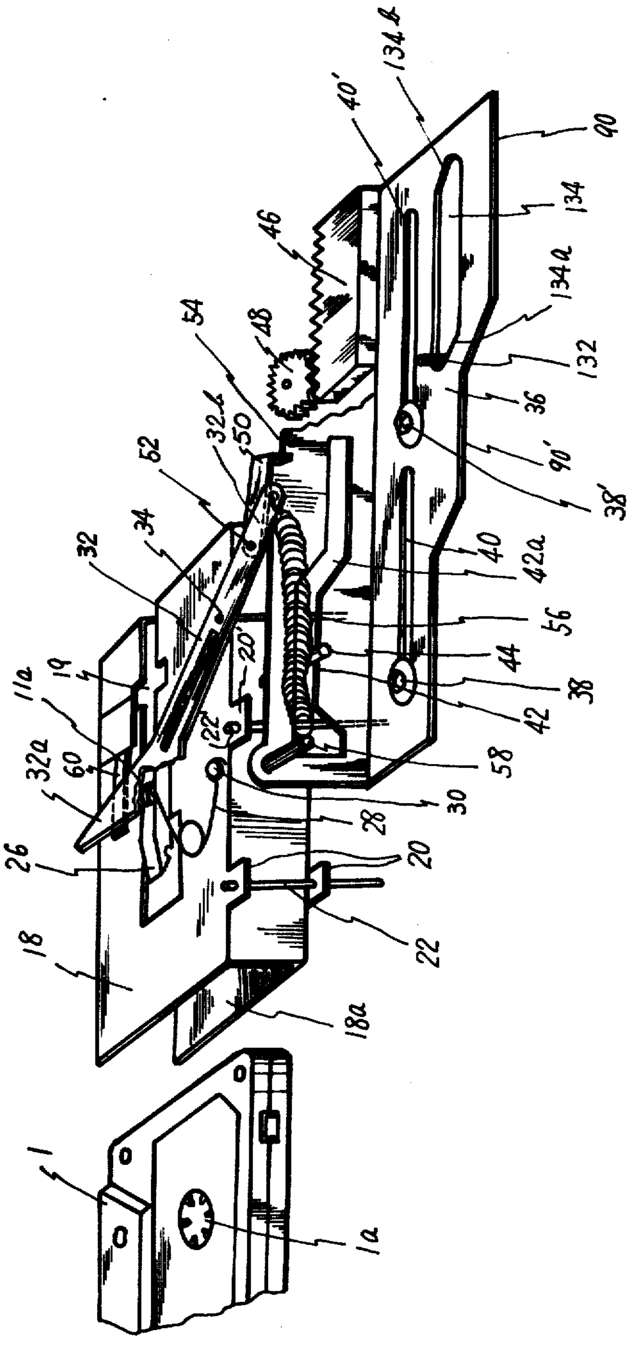
FIG. 2 is an enlarged perspective view of a cassette container and a mechanism for lifting and lowering the container together with an ejecting means for a cassette, with the portions broken away for illustration.

A cassette container 18 is provided on the chassis 14 and includes a side opening 18*a* aligned with the opening 16 in the cabinet for receiving the cassette as seen from FIG. 2. The cassette container 18 may be provided with a pair of ears 20 and 20' (FIG. 2) through which a corresponding pair of pins 22 and 22' extend so that the container 18 can vertically move to a high or cassette receiving position in which the container 18 is aligned with the opening 16 in the cabinet 12 as indicated at phantom in FIG. 3 and to a low or cassette operating position in which the container is lowered so that a tape is in the same level to those of components, such as heads, a capstan and a pinch roller which will be described later. The pins 22 and 22' are secured to the chassis 14 as shown in FIG. 1. The cassette 1 has a pair of conventional reels 1*a* which are adapted to a pair of corresponding reel shafts 24 and 24' rotatably supported on the chassis 14, in the lower position of the cassette container 18.

The cassette container 18 is provided with a guide slot 19 in the upper wall of the container 18 along which slot a guide member 26 is slidably movable. The guide member 26 includes an abutment (not shown) to bear against a portion of the cassette inserted into the container 18. The guide member 26 is also provided on the lower face thereof with a projection (not shown) engaging one of the reels when the cassette 1 is inserted into the container until the cassette bears against the abutment on the guide member 26. The guide member 26 is resiliently supported by a snap spring 28 one end of which is secured to the guide member 26 and the other end of which is secured to a pin 30 on the container 18 so that the guide member 26 is retained either in a first position in which the guide member is adjacent to the side opening 18*a* as shown in FIG. 2 or in a second position in which the guide member is adjacent to that end of the slot 19 far from the side opening 18*a* as shown in FIG. 1. As the cassette 1 is inserted until it bears against the guide member 26 and further moves in rightward direction as viewed from FIG. 2, the snap spring is compressed until both ends of the snap spring 28 are spaced by the closest distance and then the cassette moves slightly beyond the dead point of the snap spring 28 in the same direction, causing the cassette to be rapidly and resiliently moved in the rightward direction as viewed from FIG. 2, by the expansion force of the snap spring 28. Thus, the cassette 1 can move to the extreme position in which the cassette is fully received in the container 18. On the contrary, as the guide member 26 is forced in leftward direction as viewed in FIG. 2, the cassette 1 is moved in the container 18 by the guide member 26 engaging the cassette while the snap spring is compressed and upon slight movement of the guide member 26 beyond the dead point of the compressed snap spring the cassette is resiliently and rapidly removed or ejected from the container 18 by the expansion force of the snap spring 28.

An ejecting means comprises a lever arm 32 which is pivoted about a pin 34 secured to the chassis 14 so that one end 32*a* of the lever arm removably engages the guide member 26. The lever arm 32 serves to force out or eject the cassette 1 from the cassette container 18 by pivoting the other end 32*b* of the lever arm in counterclockwise direction as viewed from FIG. 2.

A slidable operating plate 36 is provided on the chassis 14 and is guided along guide pins 38 and 38' which extend through respective longitudinal slots 40 and 40' in the slidable operating plate 36 in a parallel manner to the insertion direction of the cassette 1 into the container 18. The operating plate is provided at the vertical wall thereof with a guide slot 42 through which extends a guide pin or projection 44 which is in turn secured to and extends from the container 18 in a horizontal manner. The guide slot 42 is so shaped that when the operating plate 36 moves in rightward direction as viewed from FIG. 2 the guide pin 44 and therefore, the container 18 are raised up along the sloping portion 42*a* of the guide slot 42 until the container 18 assumes the raised position shown in FIG. 2 and so that when the operating plate 36 moves leftwardly as viewed from FIG. 2 the guide pin and the container 18 are lowered until the container assumes the lowered position shown in FIG. 3. The operating plate is provided with a rack portion 46 secured thereto by any suitable means and meshed with a pinion 48 which will be described hereinafter. Thus, reversible rotation of the pinion 48 permits the operating plate to move either in rightward direction or in leftward direction corresponding to the rotation direction of the pinion.

An actuator 50, which may be formed of a reverse L-shaped member, is pivoted on the end 32*b* of the lever arm 32 about an axis 52 on the lever arm and at the vertical portion of the actuator 50 engages a shoulder 54 provided on the vertical wall of the operating plate 36. A coil spring 56 is disposed with one end connected to the end 32*b* of the lever arm and with the other end connected to a pin 58 on the operating plate, so that the lever arm 32 is urged to be pivotally pulled about the axis 34 with the end 32*a* removed away from the guide member and with the actuator 50 engaging against the shoulder 54. An engaging blade 60 in the form of blade spring, which is mounted on the top of the cassette container, serves to slightly raise up the end 32*a* of the lever arm 32 when the guide member 26 is rightwardly forced in the raised position of the container during insertion of the cassette 1 into the container 18. Thus, the cassette and therefore the guide member can be moved without any interference with the lever arm 32.

Figure 4:
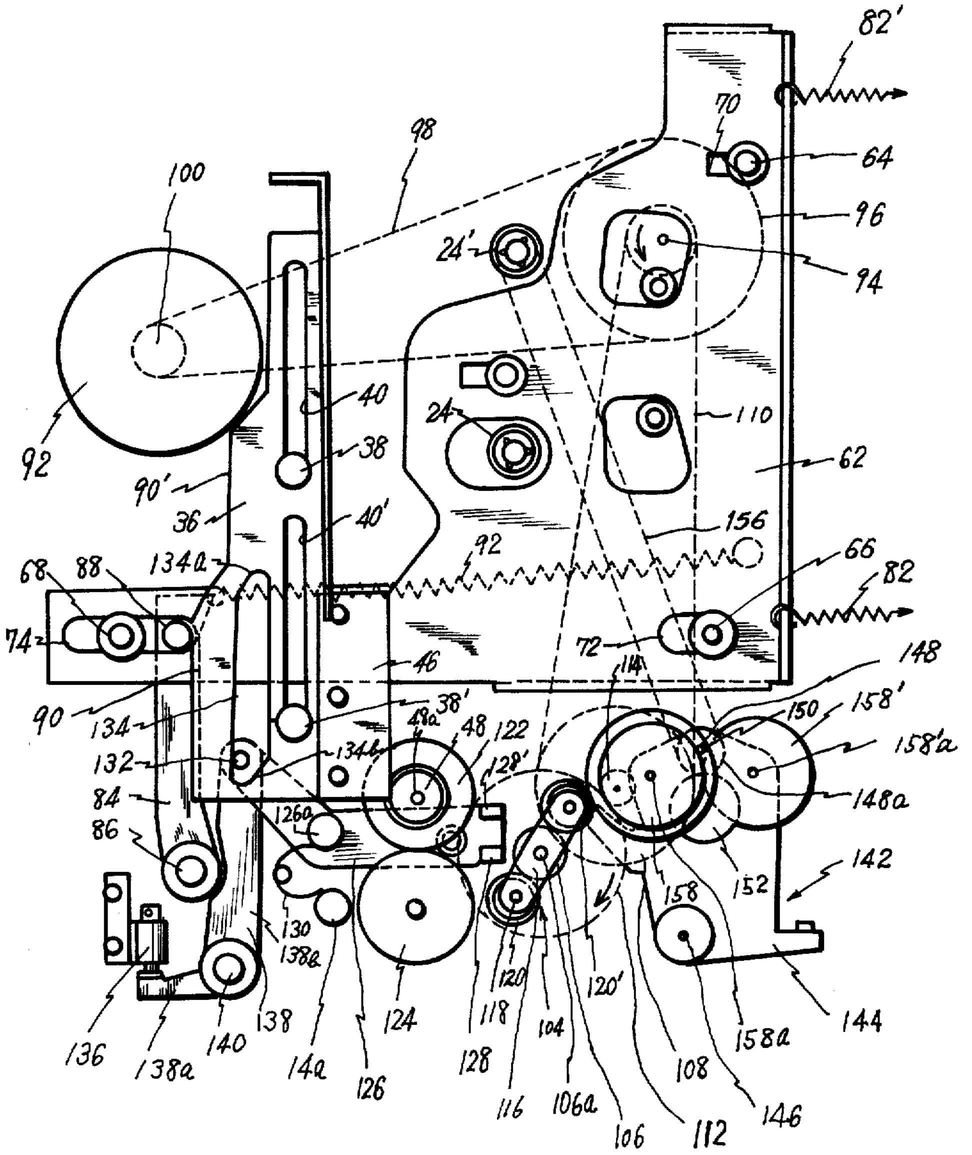
FIG. 4 is an enlarged top view of a head carrying plate for carrying head means and pinch roller means and a mechanism for moving the head carrying plate in forward and backward directions relative to the cassette in the tape recorder.

A head carrying plate 62 is slidable on the chassis 14 along guide pins 64, 66 and 68 which are mounted on the chassis 14 and extend through respective slots 70, 72 and 74 in the head carrying plate 62 (FIGS. 1 and 4). The plate has an advanced position relative to the front face of the cassette in the operating position within the container 18 and a retracted position relative to front face of the cassette in the same position. An erasing head 76, a recording and reproducing head 78 and a pinch roller 80 are mounted on the head carrying plate 62 by any suitable means (FIG. 1). In the advanced position of the head carrying plate 62, the components 76, 78 and 80 extend through the front openings (not shown) of the cassette and engage the tape in the cassette 1.

In the retracted position of the head carrying plate, the components 76, 78 and 80 are far away from the front of the cassette.

A pair of coil springs 82 and 82' (FIG. 4) are tensioned between the head carrying plate 62 and the chassis 14 so that the head carrying plate and therefore, the components 76, 78 and 80 are pulled away from the cassette container 18. A rotatable arm 84 is pivotally mounted on the chassis about an axis 86 and includes an upstanding pin 88 provided on the free end of the arm 84 and extending through the slot 74 for engagement with the rear face of the operating plate 36. As seen from FIGS. 1, 2 and 4, the rear face of the operating plate 36 comprises a cam face including different vertical planes 90 and 90' so that the upstanding pin 88 is pivotable about the pin 86 following the cam face of the operating plate 36. A coil spring 92 is tensioned between the head carrying plate 62 and the upstanding pin 88 so that the upstanding pin engages against the cam face of the operating plate and so that the head carrying plate 62 moves forwardly or backwardly in response to the pivotal movement of the upstanding pin 88 against the action of the coil springs 82 and 82'.

Thus, it will be understood that as the operating plate 36 is rightwardly moved by the rack and pinion assembly 46 and 48 as viewed from FIG. 2, the cassette container 18 is lifted to the raised up position in which the cassette 1 is forced out by engagement of the lever arm 32 with guide member 26 while the lever arm is pivoted in counterclockwise direction (FIG. 2) by engagement of the actuator 50 against the shoulder 54 of the operating plate. Simultaneously, the head carrying plate 62 and therefore, the components 76, 78 and 80 are retracted by pivotal movement of the upstanding pin 88 in clockwise direction as viewed from FIGS. 1 and 4. On the contrary, leftward movement of the operating plate 36 as viewed from FIG. 2, which is caused by insertion of the cassette 1 into the container 18 as described above, causes the cassette container 18 together with the cassette to be moved to the operating position and also the head carrying plate 62 together with the components 76, 78 and 80 to be advanced for playing the tape recorder.

An electric motor 92 is mounted on the chassis 14 to operate the tape recorder. A capstan 94 is rotatably supported on the chassis and connected to a pulley 96 which is in turn driven by an endless belt 98 tensioned between the pulley 96 and a pulley 100 mounted on the motor output shaft. The capstan 94 is arranged to be moved into and removed from the cassette 1 through the bottom wall thereof, corresponding to movement of the cassette in the container 18 to the lowered and raised up positions. A first switching element 102 is disposed in the cassette container 18 at the remote side opening 18*b* from the side opening 18*a* so that when the cassette 1 is fully inserted into the cassette container 18 the switching element 102 is closed by engagement of the cassette with the switching element.

On the chassis 14 is mounted a sun and planet gear mechanism 104 which comprises a sun gear 106 driven from the pulley 96 through a pulley 108 (FIG. 4) which is driven by an endless belt 110 tensioned between the pulleys 96 and 108, and through a gear 112 meshed with a pinion 114 on the pulley 108. Thus, the operation of the electric motor 92 causes the capstan 94 to be rotated in counterclockwise direction and also the sun gear 106 of the sun and planet gear mechanism to be always rotated in clockwise direction, as viewed from FIG. 4. The sun and planet gear mechanism 104 has a planet gear carrying arm 116 at the middle portion thereof rotatably mounted on the shaft 106*a* of the sun gear and at both ends of the planet gear carrying arm mounting a pair of shafts 118 and 118' on which are rotatably mounted a pair of planet gears 120 and 120' meshed with the sun gear 106, respectively. Thus, rotation of the sun gear 106 causes both the planet gears 120 and 120' to be rotated about their axes in counterclockwise direction as viewed from FIGS. 1 and 4 and also to revolve around the sun gear 106 in clockwise direction as viewed from FIGS. 1 and 4 if there is no interference with them.

The pinion 48 meshed with the rack portion 46 on the operating plate 36 for sliding movement thereof, has a transmission gear 122 connected to the shaft 48*a* for rotation together with the pinion 48. The transmission gear is meshed with a reversing transmission gear 124 of the same diameter to that of the transmission gear 122.

A locking member 126 is provided on the chassis 14 and comprises a first locking portion 128 and a second locking portion 128' which are spacedly integral with the front edge of the locking member 126 for selectively engaging the planet gears 120 and 120' to thereby restrain them from revolving around the sun gear 106. The locking member 126 is supported by a snap spring 130 one end of which is connected to the locking member 126 at a point 126*a* and the other end of which is secured to the chassis 14 at a point 14*a* so that the locking member 126 is held either in the advanced position of the locking portions or in the retracted position of the locking portions. The locking member 126 is also provided with a pin 132 secured to the farther end of the member from the locking portions 128 and 128' and extending through a locking member guiding slot 134 in the slidable operating plate 36 at the horizontal wall thereof. The guiding slot 134 has a first guide face 134*a* so shaped that when the slidable operating plate 36 reaches the position shown in FIG. 2 the locking member 130 moves in a forward direction to a position in which the locking portion 128 is displaced out of the orbit of the planet gears 120 and 120', but in which the locking portion 128' is positioned on the orbit of the planet gears 120 and 120' and has a second face 134*b* so shaped that when the slidable operating plate 36 reaches the position shown in FIG. 1 the locking member 130 moves in a backward direction to a position in which the locking portion 128' is displaced out of the orbit of the planet gears 120 and 120', but in which the locking portion 128 is positioned on the orbit of the planet gears 120 and 120'. Thus, when the planet gear 120 or 120' engages the first locking portion 128 of the locking member 126 in the retracted positon to stop the revolution around the sun gear 104, the planet gear becomes meshed with the reversing transmission gear 124 to rotate the transmission gear 122 in counterclockwise direction as viewed from FIGS. 1 and 2 so that the operating plate 36 moves in rightward direction as viewed from FIG. 2 to the position shown in this figure until the cassette 1 is forced out of the container 18 as described above. At that time, as previously mentioned, the locking member 126 advances so that the first locking portion 128 is displaced out of the orbit of the planet gears with the locking portion 128' positioned ready for locking the planet gear 120 or 120'. Accordingly, with next intended insertion of the cassette 1 into the container 18, the transmission gear 122 meshing with the planet gear 120 or 120' to rotate in the clockwise direction as viewed from FIGS. 1 and 2 permits the operating plate 36 to move in leftward direction as viewed from FIG. 2 to the position shown in FIG. 1 until the tape recorder is ready for its operation. At that time, similarly as previously described, the locking member is retracted so that the second locking portion 128' is displaced out of the planet gear orbit with the locking portion 128 positioned ready for locking the planet gear 120 or 120'. During movement of the locking member 126 to the advanced or retracted position, the snap spring 130 is compressed and moved slightly beyond the dead point to rapidly and resiliently shift the locking member 126 to either of the advanced and retracted positions in the same manner as described in connection with the snap spring 28.

Figure 5:
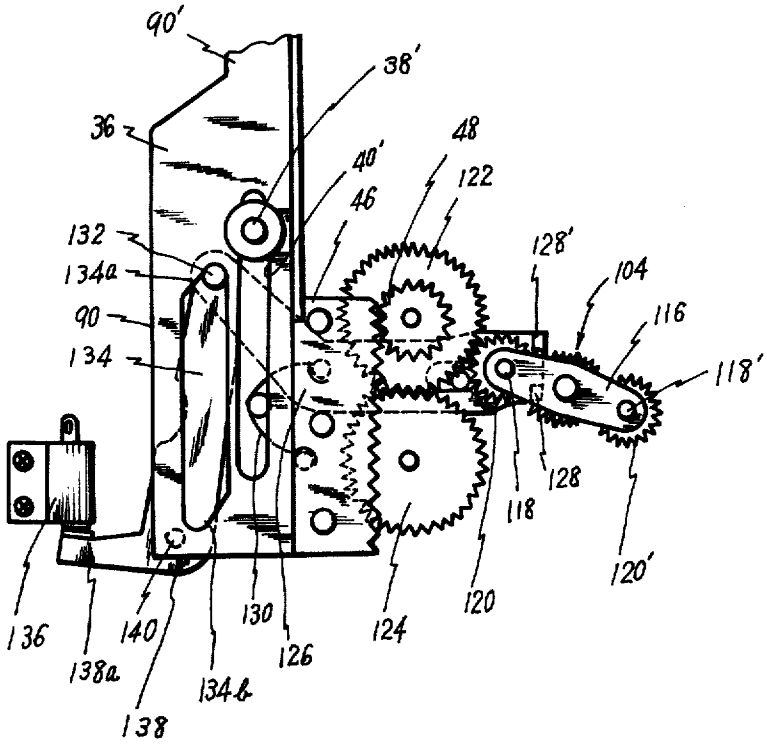
FIG. 5 is an enlarged top view of a portion of the mechanism shown in FIG. 4 in the non-operating position.

A second switching element 136 is mounted on and secured to the chassis 14 by any suitable means. This switching element is arranged in facing relation to a pivotal lever 138 at the one arm 138*a* thereof, which is pivoted on the chassis 14 about an axis 140. The other arm 138*b* of the pivotal lever 138 is operatively associated with the pin 132 on the locking member 126. The second switching element 136 and the lever arm 138*a* are so arranged that when the pin 132 on the locking member 126 lies in the position shown in FIG. 4 or moves from this position to the position shown in FIG. 5 the switching element 136 remain closed by relief from thrust from the lever arm 138*a*, but that when the pin 132 on the locking member 126 lies in the position shown in FIG. 5 or moves from this position to the position shown in FIG. 4 remains open by the pivotal lever 138 pivoted about the axis 140 in clockwise direction as viewed from FIG. 5 caused by movement of the pin 132 on the locking member 120 guided by the slot 134. The second switching element 136 is connected in parallel to the first-mentioned switching element 102 so that either of the switching elements 102 and 136 energizes the electric motor 92 for operation of the tape recorder. It should be noted that since the second switching element 136 is maintained to be closed until the operating plate 36 reaches the position shown in FIG. 2, even though the first switching element 102 is opened by the cassette 1 disengaged from the switching element, the electric motor 92 continues to be energized by the closed second switching element 136 until the operating plate 36 reaches the position shown in FIG. 2. At that time the second switching element 136 is opened to stop energization of the electric motor 92 and simultaneously the locking member 126 is so positioned that the locking portion 128' locks the planet gear 120 or 120' as shown in FIG. 5 for the next operation of the operating plate 36. Thus, when the cassette 1 is again inserted into the container 18 to close the first switching element 102, the electric motor 92 is energized to rotate the transmission gear 122 and therefore, the pinion 48 by engagement of the transmission gear 122 with the planet gear 120 or 120' to thereby move the operating plate 36 to the position shown in FIG. 1 in which the locking member 126 is retracted to relieve the planet gear 120 or 120' from the locking portion 128' of the locking member 126 to thereby permit the planet gears to revolve around the sun gear in clockwise direction as viewed from FIGS. 1 and 4.

A triggering mechanism 142 is provided which comprises a pivotal base 144 pivoted on the chassis 14 about an axis 146. The base 144 has a response gear 148 (FIG. 4) rotatably journaled on a shaft 150 on the base and a transmission gear 152 is rotatably mounted on a rocking plate 154 which is in turn pivotally mounted on the base 144 about the axis of the shaft 150 with the transmission gear 152 always meshed with the response gear 148. The response gear 148 is provided with a pulley 148*a* integral therewith and driven by an endless belt 156 tensioned between the pulley 148*a* and a pulley (not shown) on the taking up reel shaft 24' (FIG. 4). Accordingly, the transmission gear 152 rotates in a direction dependable upon the rotation direction of the supplying reel shaft 24'. The supplying reel shaft 24' is driven by the electric motor 92 through a transmission (not shown). A pair of driven gears 158 and 158' are rotatably mounted on the base 144 about their axes 158*a* and 158'*a* and provided with respective gears 160 and 160' integrally associated with the driven gears 158 and 158' (FIG. 1). The driven gears 158 and 158' are meshed with each other and so arranged that the transmission gear 152 is selectively meshed with the gear 160 or 160' depending upon the rotational direction of the transmission gear 152. Thus, if the transmission gear 152 is driven by the reel shaft 24' in counterclockwise direction (FIG. 1) then the transmission gear 152 is rotated about the axis 150 in clockwise direction until it engages with the gear 160 and as a result the gears 160 and 158 are driven in clockwise direction. Similarly, if the transmission gear 152 is driven by the reverse rotation of the reel shaft 24' in clockwise direction then the transmission gear 152 now driven in clockwise direction is so rocked that it engages with the gear 160' and as a result the gears 160' and 158' are driven in counter-clockwise direction to thereby rotate the driven gear 158 in clockwise direction (FIG. 1) because of the latter meshed with the driven gear 158'. Accordingly, it will be understood that the driven gear 158 is always rotated in clockwise direction in spite of the reel shaft 24' rotated in feeding or feeding back direction.

The driven gear 158 is also provided with a friction disk 162 formed of felt or rubber, for example having a predetermined friction coefficient. Also, the planet gears 120 and 120' are provided with friction disks 164 and 164' secured thereto and formed of felt or rubber having a predetermined frictional coefficient in the same manner as described in connection with the friction disk 162. The triggering base is urged by a spring 166 tensioned between the base 144 and the chassis 14 so that the base and the components on the base are swung about the axis 146 in counterclockwise direction as viewed from FIG. 1 until the portion 144*a* engages a stop 168 mounted on the chassis 14. In such position of the base 144 urged by the spring 166 the friction disk 164 or 164' on the planet gear if relieved from the locking portion 128', engages the friction disk 162 on the driven gear 158. Accordingly, if the friction disk 162 on the driven gear 158 has the peripheral speed higher than that of the friction disk 164 or 164' on the planet gear, then the planet gear 120 or 120' is prevented from revolving around the sun gear 104. But, if the friction disk 162 has the peripheral speed lower than that of the friction disk 164 or 164' or otherwise stops by stoppage of the reel shaft 24' then the friction disk 164 or 164' forces away the friction disk 162 together with the base 144 and as a result the triggering mechanism permits the planet gears 120 and 120' to revolve around the sun gear 104. It will be understood that this is also effected by the base forcedly pivoted about the axis 146 in clockwise direction as viewed from FIG. 1 for the purpose of ejection of the cassette 1.

In operation, as the cassette 1 is manually inserted into the cassette container 18 until it reaches the extreme position, the first switching element 102 is closed by engagement with the cassette to permit the electric motor 92 to be energized. Accordingly, the sun and planet gear mechanism 104 is driven by the electric motor 92 through the belt-pulley assembly 96, 110 and 108. Since the planet gear 120 or 120' is now meshed with the transmission gear 122, the pinion 48 is rotated in clockwise direction as viewed from FIG. 2 until the cassette container 18 reaches the lower position. At the same time, the head carrying plate 62 is advanced so that the heads 76 and 78 and the pinch roller 80 engage the tape in the cassette as previously described. Thus, the tape recorder can be played by feeding the tape by means of a tape feeding mechanism not shown. It should be noted that the sun and planet gear mechanism is relieved from the locking portion 128' on the locking member 126. As a result, the planet gear 120 or 120' revolves around the sun gear 104 until the friction disk 164 or 164' on the planet gear engages the friction disk 162 on the driven gear 158 now rotating at higher speed in clockwise direction as viewed from FIG. 1.

When the tape terminates to be fed, the deceleration or stoppage of the tape permits the friction disk 164 or 164' together with the planet gear 120 or 120' to revolve around the sun gear 104 against the rotation at relatively lower speed or stoppage of the friction disk 162 together with the driven gear 158 to relieve the planet gear 120 or 120' from the triggering mechanism until it engages the locking portion 128 on the locking member 126 now retracted to the position shown in FIG. 4. Accordingly, the planet gear 120 or 120' is meshed with the reverse transmission gear 124 so that the pinion 48 rotates in counterclockwise direction as viewed from FIG. 1. Rotation of the pinion 48 in that direction causes the operating plate 36 to be moved in rightward direction as viewed from FIG. 2 to thereby raise up the container 18 and then force the cassette out of the container 18 as previously described. As also aforementioned, even though the cassette 1 disengages with the first switching element 102 the second switching element 136 is still closed to remain the electric motor energized to thereby continue movement of the operating plate 36 until the cassette 1 is fully removed from the container 18. At that time, the electric motor 92 is deenergized by the second switching element 136 disengaged with the lever arm 138*a* of the lever 138 operatively associated with the locking member 126 now advanced to the position shown in FIG. 5. It will be understood that the heads 76 and 78 and the pinch roller 80 are retracted relative to the cassette 1 in the container 18 during the movement of the operating plate in rightward direction as viewed from FIG. 2.

While one preferred embodiment of the invention has been described in detail with reference to the accompanying drawings, it will be apparent to those skilled in the art that various modifications and changes in arrangement and construction will be made without departing from the scope and spirit of the invention, which has been defined only in the appended claims.

What is claimed is:

1. A cassette type tape recorder comprising a cassette including a tape therein; a cassette container into which said cassette is inserted and from which said cassette is removed, said cassette container having a first position in which said cassette is positioned for playing the tape recorder and a second position in which said cassette is positioned for insertion into or removal from said cassette container; an assembly including magnetic head means and pinch roller means and having a first position in which said assembly is positioned for playing the tape recorder and a second position in which said assembly recorder and a second position in which said assembly is retracted relative to said cassette; operating means movable to move said cassette container and said assembly to said first and second positions in response to the direction of movement of said operating means; transmission means including a transmission gear and a reverse transmission gear meshed with said transmission gear, said transmission gear operatively associated with said operating means for movement of said operating means in first and second directions; a sun and planet gear mechanism including sun gear means and planet gear means meshed with said sun gear means for rotation about its axis and about an axis of said sun gear means, said transmission gear and said reverse transmission gear disposed on the orbit of said planet gear means of said sun and planet gear mechanism; power supply to selectively drive said tape in one and another directions and to drive said sun and planet gear mechanism in one direction; and locking means to selectively lock said sun and planet gear mechanism so as to mesh said planet gear means with one of said reverse transmission gear and said transmission gear of said transmission means whereby upon said operating means positioned to place said cassette container and said assembly in said first position and said locking means locks said planet gear means to be meshed with said reverse transmission gear of said transmission means for movement of said cassette container and said assembly to said second position and upon said operating means positioned to place said cassette container and said assembly in said second position said locking means locks said planet gear means to be meshed with said transmission gear of said transmision means for movement of said cassette container and said assembly to said first position.

2. A cassette type tape recorder as set forth in claim 1, wherein said operating means is provided with a rack portion meshed with a pinion which is operatively connected with said transmission gear.

3. A cassette type tape recorder as set forth in claim 1, wherein said operating means comprises a plate member including a vertical wall and a slot in said vertical wall of said plate member, and said cassette container including a portion extending through said slot in said plate member whereby said cassette container vertically moves in response to slidable movement of said operating means.

4. A cassette type tape recorder as set forth in claim 1, wherein said assembly comprises a head carrying plate to carry said head means and said pinch roller means, said head carrying plate associated with a cam means provided on said operating means for advanced or retracted movement.

5. A cassette type tape recorder as set forth in claim 1, wherein said locking means comprises a locking member carrying first and second locking portions, said first locking portion arranged to mesh said planet gear means of said sun and planet gear mechanism with said reverse transmission gear of said transmission means and said second locking portion arranged to mesh said planet gear means of said sun and planet gear mechanism with said transmission gear of said transmission means.

6. A cassette type tape recorder as set forth in claim 1, further comprising a first switching means disposed so that when said cassette is fully inserted into said container said first switching means is closed by engagement with said cassette and a second switching means connected in parallel to said first switching means, said first and second switching means connected to said power supply, said first switching means is operated when closed to move said container to said first position, said second switching means so arranged that during said first position of said cassette container and after movement of said cassette container from said first position until it reaches said second position said second switching means remains closed, but that during said second position of said cassette container and after movement of said cassette container from said second position until it reaches said first position said second switching means remains open and operatively cooperates with said operating means so that when said container reaches said second position said operating means opens said second switching means; and ejecting means to automatically force said cassette out of said cassette container in response to movement of said operating means so that said cassette container is moved from said first to said second position, said cassette ejecting means continuing to operate by said second switching means continuing to be closed even after disengagement of said cassette with said first switching means.

7. A cassette type tape recorder as set forth in claim 6, wherein said second switching means comprises a switching element and a pivotal lever, one end of which is arranged to engage said switching element for closure and the other end of which is operatively associated with said operating means.

8. A cassette type tape recorder as set forth in claim 6, wherein said cassette ejecting means comprises a guide member slidable in said container and engaging said cassette in said container, a lever arm pivoted at an axis between said container and said operating means, with one end of said lever arm engaging said guidemember for forcing said cassette out of said container and with the other end of said lever arm operatively associated with said operating means during movement of the latter to said second position of said container, and a snap spring means provided between said guide member and said container, having the dead point beyond which it acts just before said container reaches said second position when said container moves from said first position.

9. A cassette type tape recorder as set forth in claim 1, further comprising a triggering mechanism including a movable base, a response gear on said base to be driven in response to feeding of said tape in said cassette, a transmission gear meshed with said response gear so that said transmission gear of said triggering mechanism is pivotable about the axis of said response gear, a pair of driven gears meshed with each other and a pair of gears integral with said driven gears, said integral gears selectively meshed with said transmission gear of said triggering mechanism so that said driven gears are always driven only in one direction even though said tape in said cassette is fed in either of a normal and reverse directions, one of said driven gears including a portion arranged to engage a portion of said planet gear means whereby when one of said driven gears has the peripheral speed higher than that of said planet gear means said driven gear portion prevents said planet gear means from revolving around said sun gear means so that said planet gear means is maintained spaced from said transmission means, but when said one of said driven gears has the peripheral speed lower than that of said planet gear means said planet gear means portion forces away said driven gear portion so that said planet gear means revolves around said sun gear means for engaging said reverse transmission gear.

10. A cassette type tape recorder as set forth in claim 9, and said triggering mechanism adapted to be forced away in the direction wherein one of said driven gears meshing with said planet gear means is disengaged with said planet gear means, in response to operation for ejection of said cassette from said cassette container.

* * * * *